United States Patent
Lee et al.

(10) Patent No.: US 10,268,297 B2
(45) Date of Patent: *Apr. 23, 2019

(54) MUTUAL-CAPACITANCE ORGANIC LIGHT EMITTING TOUCH DISPLAY APPARATUS

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW); Chia-Hsun Tu, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,676

(22) Filed: May 7, 2017

(65) Prior Publication Data

US 2018/0321778 A1    Nov. 8, 2018

(51) Int. Cl.
*G06F 3/041* (2006.01)
*G06F 3/044* (2006.01)
*G09G 3/3225* (2016.01)

(52) U.S. Cl.
CPC ............ *G06F 3/0412* (2013.01); *G06F 3/044* (2013.01); *G06F 3/0416* (2013.01); *G06F 2203/04107* (2013.01); *G06F 2203/04112* (2013.01); *G09G 3/3225* (2013.01)

(58) Field of Classification Search
CPC ...... G06F 3/044; G06F 3/0412; G06F 3/0416; G06F 2203/04107; G06F 3/0418; G09G 3/2092; G09G 3/3225; G09G 3/3648; G02F 1/1368; G02F 1/13338

See application file for complete search history.

(56) References Cited

U.S. PATENT DOCUMENTS

| | | | | |
|---|---|---|---|---|
| 5,847,690 | A * | 12/1998 | Boie | G06F 3/0412 345/104 |
| 9,965,119 | B2 * | 5/2018 | Lee | G06F 3/044 |
| 9,977,526 | B1 * | 5/2018 | Lee | G06F 3/0412 |
| 10,120,476 | B1 * | 11/2018 | Lee | G06F 3/0412 |

(Continued)

FOREIGN PATENT DOCUMENTS

CN    205176820 U  *  4/2016  ............. G06F 3/044

*Primary Examiner* — Patrick F Marinelli
(74) *Attorney, Agent, or Firm* — Chun-Ming Shih; HDLS IPR Services

(57) ABSTRACT

A mutual-capacitance organic light emitting touch display apparatus includes a thin film transistor substrate, a common electrode layer, an organic light emitting material layer, and at least a touch electrode layer, including a plurality of first touch electrodes arranged along a first direction, and a plurality of second touch electrodes arranged along a second direction; a thin film encapsulation layer; a display controller having a display power source, and electrically connected to a thin film transistor, a pixel electrode and the common electrode layer of the thin film transistor substrate; and a touch controller including a touch power source. The touch controller applies a touch driving signal to a selected first touch electrode, and senses a touch sensing signal at a second touch electrode, and outputs the touch sensing signal to the common electrode layer or a reference point of the display controller by a non-inverting amplifier.

11 Claims, 19 Drawing Sheets

(56) References Cited

U.S. PATENT DOCUMENTS

| | | | | |
|---|---|---|---|---|
| 2005/0225233 A1* | 10/2005 | Boroson | ............... | H01L 27/322 313/504 |
| 2007/0216657 A1* | 9/2007 | Konicek | ............... | G06F 3/0412 345/173 |
| 2009/0009485 A1* | 1/2009 | Bytheway | ............... | G06F 3/044 345/174 |
| 2010/0110038 A1* | 5/2010 | Mo | ........................ | G06F 3/044 345/174 |
| 2010/0136868 A1* | 6/2010 | Chien | ................... | G06F 3/0412 445/24 |
| 2010/0220071 A1* | 9/2010 | Nishihara | ............. | G06F 3/0416 345/173 |
| 2011/0273399 A1* | 11/2011 | Lee | ...................... | G06F 3/0418 345/174 |
| 2012/0050214 A1* | 3/2012 | Kremin | ................. | G06F 3/0418 345/174 |
| 2012/0206395 A1* | 8/2012 | Misaki | .................. | G06F 3/0412 345/173 |
| 2013/0063395 A1* | 3/2013 | Byun | ..................... | G06F 3/044 345/174 |
| 2014/0042406 A1* | 2/2014 | Degner | ................. | H01L 27/326 257/40 |
| 2015/0091849 A1* | 4/2015 | Ludden | ................. | G06F 3/0412 345/174 |
| 2015/0268778 A1* | 9/2015 | Okamura | ............. | G06F 3/0412 345/173 |
| 2016/0231837 A1* | 8/2016 | Baek | ...................... | G06F 3/044 |
| 2017/0357364 A1* | 12/2017 | Lee | ...................... | G06F 3/0416 |
| 2017/0357366 A1* | 12/2017 | Lee | ...................... | G06F 3/0416 |
| 2018/0074629 A1* | 3/2018 | Lee | .................... | G02F 1/13338 |
| 2018/0292930 A1* | 10/2018 | Lee | ...................... | G06F 3/044 |
| 2018/0321762 A1* | 11/2018 | Lee | ........................ | G06F 3/044 |
| 2018/0321777 A1* | 11/2018 | Lee | ...................... | G06F 3/0412 |
| 2018/0321778 A1* | 11/2018 | Lee | ...................... | G06F 3/0412 |

* cited by examiner

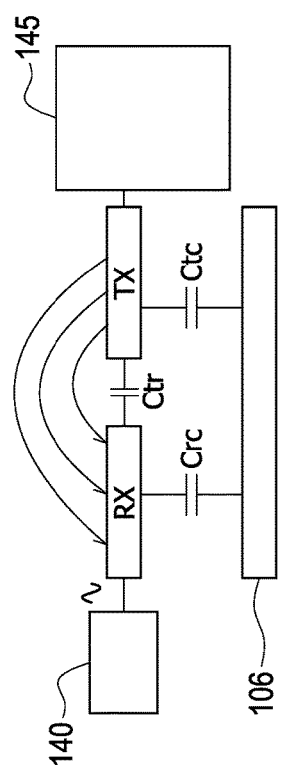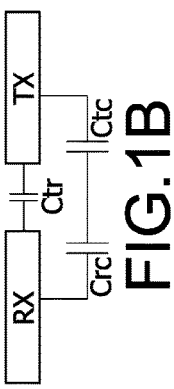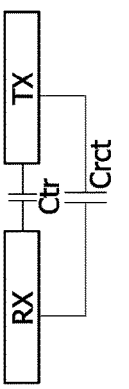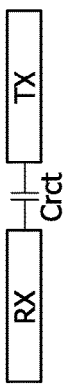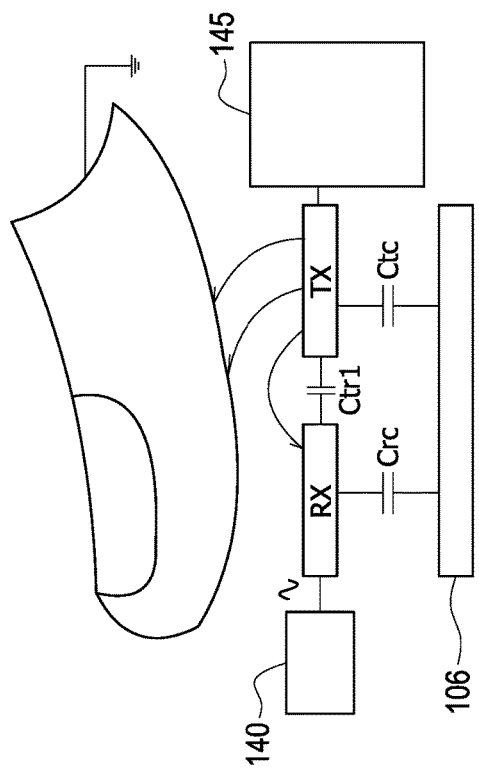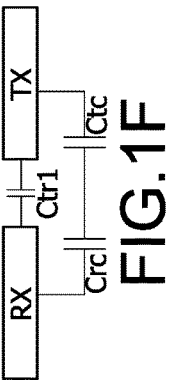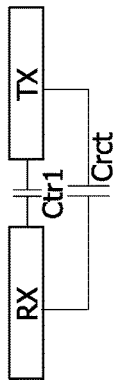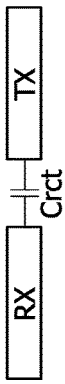

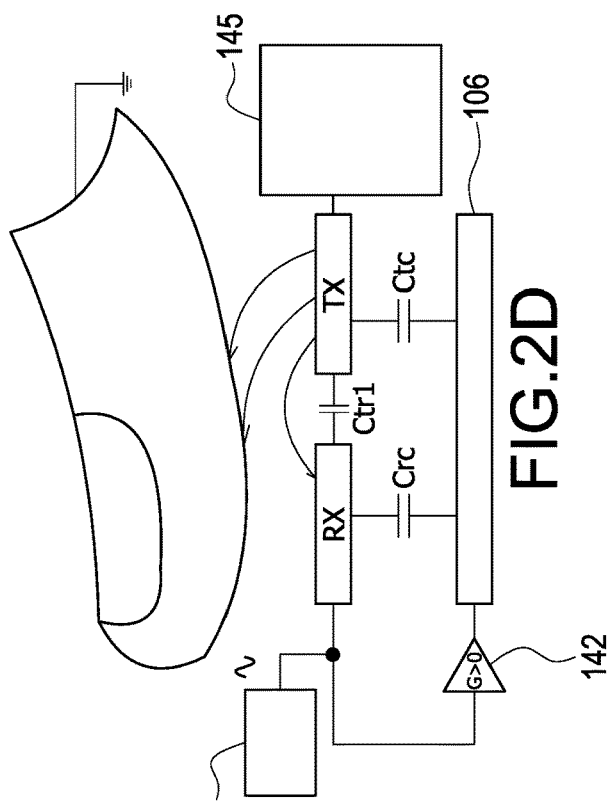
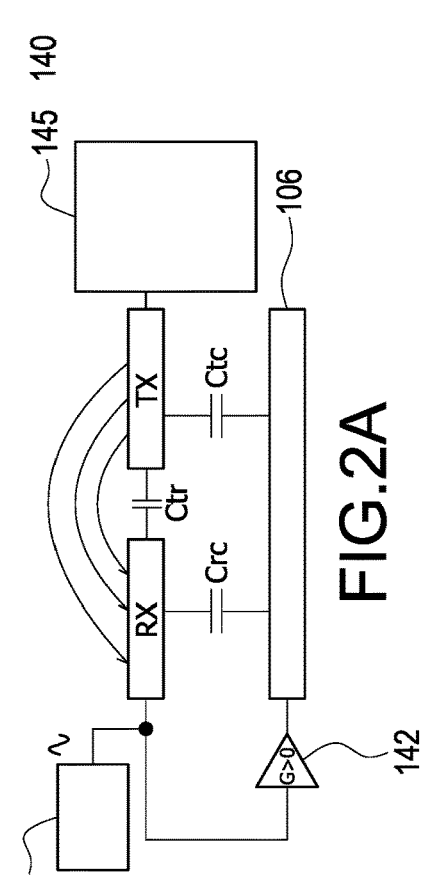

MUTUAL-CAPACITANCE ORGANIC LIGHT EMITTING TOUCH DISPLAY APPARATUS

BACKGROUND OF THE INVENTION

Field of the Invention

The present invention relates to an organic light emitting touch display apparatus, especially to a mutual-capacitance organic light emitting touch display apparatus.

Description of Prior Art

To replace heavy cathode tube display, there comes panel display like liquid crystal display, plasma display and organic light emitting diode display, etc. Touch display panel develops with popular mobile device, and mobile electronic device grows lighter and thinner, thus embedded touch display panel becomes popular quickly. However, there is large background stray capacitance due to small separation between touch electrode and common voltage electrode of liquid crystal panel (or common cathode/common anode of OLED panel), if the touch electrode is embedded in panel structure. Therefore, this discourages the use of mutual capacitance touch scheme with advantages of fewer wirings, easy multi-points detection, and simple circuit. Thus, it is needed to overcome difficulty of sensing change of touch mutual-capacitance under large background stray capacitance, and removing large noise from the background stray capacitance.

SUMMARY OF THE INVENTION

Accordingly, the present invention is directed to provide a mutual-capacitance organic light emitting touch display apparatus.

The present invention discloses a mutual-capacitance organic light emitting touch display apparatus including: a thin film transistor substrate having a plurality of thin film transistors, a plurality of pixel electrodes, a plurality of gate lines and a plurality of data lines arranged on a surface of the thin film transistor substrate, wherein the thin film transistors are respectively connected to the pixel electrodes, the gate lines and the data lines corresponding to the thin film transistors; a common electrode layer; an organic light emitting material layer arranged between the common electrode layer and the thin film transistor substrate; at least a touch electrode layer arranged on a side of the common electrode layer, and the side opposite to the organic light emitting material layer, the touch electrode layers comprising a plurality of first touch electrodes arranged along a first direction, and a plurality of second touch electrodes arranged along a second direction, wherein the first direction differs from the second direction; a thin film encapsulation layer arranged between the thin film transistor substrate and the touch electrode layer; a display controller having a display power source, and electrically connected to the thin film transistors, the pixel electrodes and the common electrode layer; a touch controller comprising a touch power source, and sequentially or randomly applying a touch driving signal to a selected first touch electrode, and sensing a touch sensing signal at a second touch electrode, and outputting the touch sensing signal to the common electrode layer or a reference point of the display controller by a non-inverting amplifier, for the touch controller to perform touch sensing, and keeping no common current loop between the display controller and the touch controller during touch sensing.

Through outputting the touch sensing signal to the common electrode layer or a reference point of the display controller by a non-inverting amplifier, influence from the background stray capacitance can be reduced. Through keeping no common current loop between the display controller and the touch controller during touch sensing, the noise from the touch controller can be avoided.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

FIGS. 1A-1H show schematic views of mutual-capacitance touch sensing of related art.

FIGS. 2A-2F show schematic views of mutual-capacitance touch sensing of the present invention.

DETAILED DESCRIPTION OF THE INVENTION

Figure 3A:
FIGS. 3A-3B show stack diagrams of mutual-capacitance organic light emitting touch display apparatuses according to different embodiments of the present invention.

Please refer to FIGS. 1A-1D, FIGS. 1A-1D show schematic views of mutual-capacitance touch sensing of related art, where user has not touch the mutual-capacitance touch device by finger. A shown in FIG. 1A, the mutual-capacitance touch device includes a touch receiver 140, a touch driving signal generator 145, a plurality of first touch electrodes (also called touch driving electrode, such as a touch driving electrode TX shown in this diagram), a plurality of second touch electrodes (also called touch sensing electrode, such as a touch sensing electrode RX shown in this diagram), and a common electrode 106 (for example, a common electrode of liquid crystal panel or common cathode/common anode of OLED panel). The shown example only describes operation of the mutual-capacitance touch device; the mutual-capacitance touch device further includes other elements for touching or displaying. After the touch driving signal generator 145 transmits the touch driving signal to the touch driving electrode TX, electric flux lines of the touch driving electrode TX is coupled to a corresponding touch sensing electrode RX, thus there is a sensing capacitance Ctr between the touch driving electrode TX and the corresponding touch sensing electrode RX. Moreover, there is a background stray capacitance Ctc between the touch driving electrode Tx and the common electrode 106, and there is a background stray capacitance Crc between the touch sensing electrode Rx and the common electrode 106. In an embedded touch device, the touch electrode is very close to the common electrode (or common cathode/common anode of OLED panel) of the liquid crystal panel, resulting in large capacitance of the background stray capacitance Ctc, Crc. As shown in FIG. 1B, the touch driving electrode TX and touch sensing electrode RX are electrically connected to the common electrode 106 via the background stray capacitance, the background stray capacitance Ctc, Crc can be regarded as being connected in series, thus can be represented by equivalent stray capacitance Crct shown in FIG. 1C. Because a capacitance value of the equivalent stray capacitance Crct is much larger than that of the capacitance Ctr, equivalently, there is only the equivalent stray capacitance Crct (as shown in FIG. 1D) after capacitance Ctr being connected in parallel with the stray capacitance Crct. In other words, because the background stray capacitance Crc is too large, variation of the capacitance Ctr is not easy to sense.

Refer to FIGS. 1E-1H, FIGS. 1E-1H show schematic views of mutual-capacitance touch sensing of related art, where the user has touched the mutual-capacitance touch device by finger. As shown in FIG. 1E, after the user touches the touch driving electrode TX by finger, the electric flux lines from the driving electrode to the sensing electrode is decrease, and the sensing capacitance Ctr becomes the touch sensing capacitance Ctr1. The variation of the capacitance is very small for the finger touching, thus the capacitance value of the touch sensing capacitance Ctr1 is very close to that of sensing capacitance Ctr. Refer to FIGS. 1F-1H, and together with FIGS. 1B-1D, because capacitance values of background stray capacitance Ctc, Crc are much larger than that of the sensing capacitance Ctr (also much larger than that of touch sensing capacitance Ctr1), in embedded architecture, it is hard for the mutual-capacitance touch sensing technology of related art to sense the capacitance variation resulted from finger touching.

Refer to FIG. 2A-2C, FIGS. 2A-2C show schematic views of mutual-capacitance touch sensing of the present invention, where the user has not touch the mutual-capacitance touch device by finger. As shown in FIG. 2A, based on the present invention, an amplifier (non-inverting amplifier) 142 with a gain larger than zero is additionally arranged in the touch receiver 140. After the touch sensing signal VRX is amplified by the amplifier 142 with a gain larger than zero, the signal resulted from the touch sensing signal VRX is outputted to an adjacent conductor close to the touch sensing electrode RX (for example, the adjacent conductor may be the common electrode 106). Because the touch sensing signal VRX is amplified without inverting (for example, the gain is 1, or larger than 1 for consideration of attenuation), and then the amplification result of the touch sensing signal VRX is applied to the common electrode 106, equivalently there is no voltage difference between the touch sensing electrode RX and the common electrode 106. In other words, the capacitance value of the background stray capacitance Crc may be reduced to minimum or zero. Refer to FIGS. 2B-2C, the background stray capacitance Crc connects the background stray capacitance Ctc in series, and accordingly the capacitance value of the series is reduced to minimum or zero. There is equivalently only the sensing capacitance Ctr between the touch driving electrode TX and the corresponding touch sensing electrode RX, making the touch receiver 140 able to sense the variation of the sensing capacitance Ctr more accurately.

Refer to FIG. 2D-2F, FIGS. 2D-2F show schematic views of mutual-capacitance touch sensing of the present invention, where the user has touched the mutual-capacitance touch device by finger. As shown in FIG. 2D, after the user touches the touch driving electrode TX by finger, the electric flux lines from the driving electrode to the sensing electrode is decrease, and the sensing capacitance Ctr becomes the touch sensing capacitance Ctr1. The variation of the capacitance is very small for the finger touching, thus the capacitance value of the touch sensing capacitance Ctr1 is very close to that of sensing capacitance Ctr. Refer to FIGS. 2E-2F, and together with FIGS. 2B-2C, because capacitance values of background stray capacitance Ctc, Crc are close to or equal to zero, thus being much smaller than that of the capacitance Ctr (much smaller than that of touch sensing capacitance Ctr1). By architectures of the present invention shown in FIGS. 2A-2F, the accuracy is greatly improved as to sense the capacitance variation resulted from the finger touching for the mutual-capacitance touch sensing device in embedded architecture.

Figure 7:
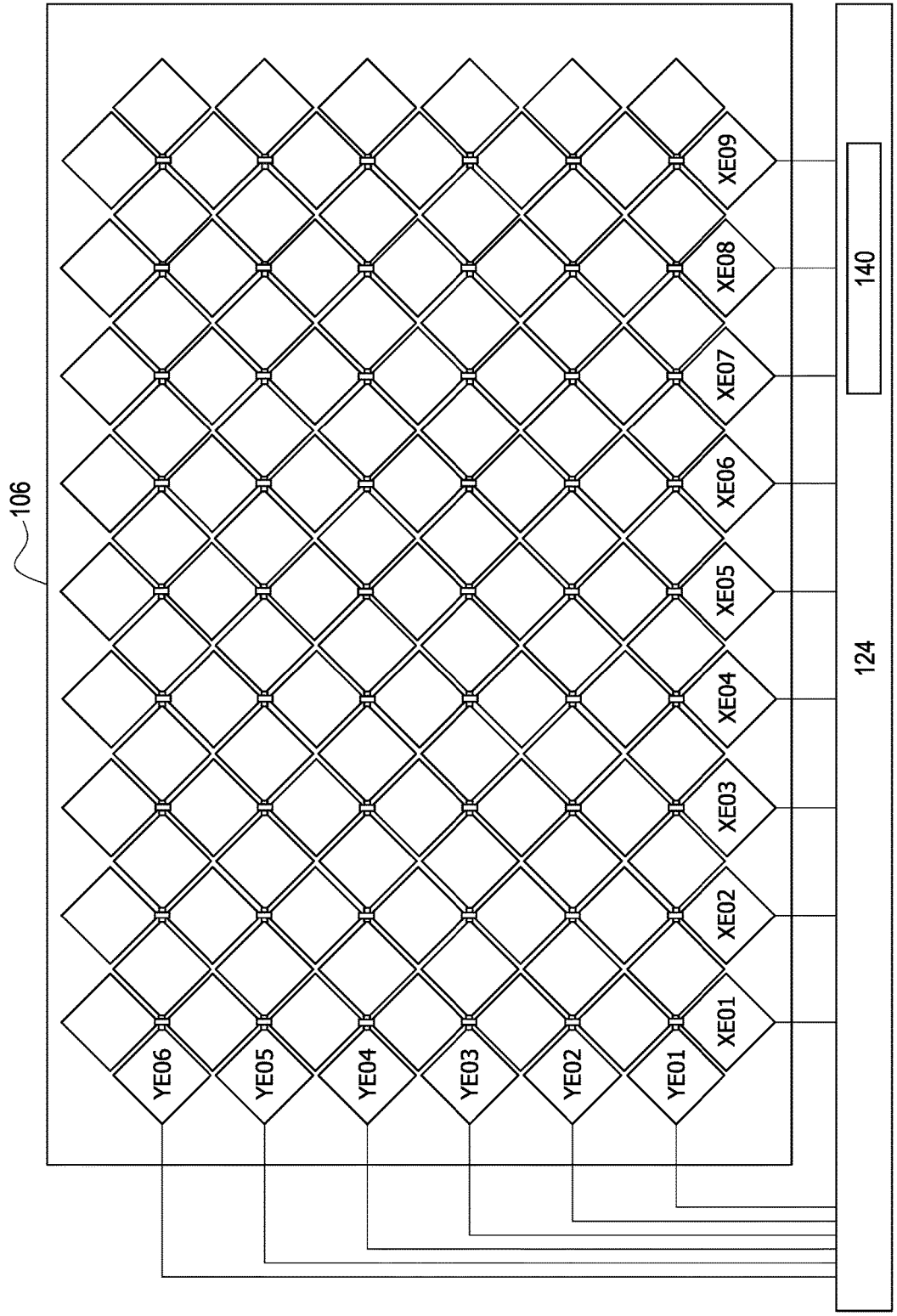
FIG. 7 shows a schematic view of a touch electrode distribution of a mutual-capacitance organic light emitting touch display apparatus with high measuring sensitivity of the present invention.

Refer to FIG. 3A, FIG. 3A shows a stack diagram of a mutual-capacitance organic light emitting touch display apparatus 10 (hereafter touch display apparatus 10) according to an embodiment of the present invention. The touch display apparatus 10 includes, from top to bottom, a touch protection layer 116, a touch electrode layer 112, a thin film encapsulation (TFE) layer 108, a common electrode layer 106, an organic light emitting material layer 104 and a thin film transistor substrate 102. The thin film transistor substrate 102 includes, from top to bottom, a pixel electrode layer 130, a thin film transistor layer 128 and a transistor substrate 126. The touch protection layer 116 is arranged on a side of the touch electrode layer 112, the side is opposite to the thin film encapsulation layer 108, and the touch protection layer 116 is a substrate or a cured coating layer, and may be made from polymer material such as glass, PI, PE, PET, etc. The touch electrode layer 112 may be made of transparent conductive material (such as ITO) or metal grid (described later). The thin film encapsulation layer 108 also may be an upper substrate or protection layer (isolating water or air), and arranged between the touch electrode layer 112 and the common electrode layer 106. The common electrode layer 106 is arranged on the organic light emitting material layer 104, making the organic light emitting material layer 104 arranged between the common electrode layer 106 and the thin film transistor substrate 102. Refer to FIG. 7, FIG. 7 shows an implementation of the touch electrode layer 112 of the touch display apparatus 10 shown in FIG. 3A, the touch electrode layer 112 includes a plurality of second touch electrodes XE01-XE09 (arranged along the second direction) and a plurality of first touch electrode YE01-06 (arranged along the first direction) coplanar with the second touch electrodes XE01-XE09, wherein the first direction is not parallel to the second direction, and may be almost perpendicular to the second direction. The second touch electrodes XE01-09 are respectively electrically connected by conductive bridges, the first touch electrodes YE01-06 are respectively electrically connected by conductive bridges, and there is an insulation layer (not shown) between the first touch electrodes YE01-06 and the second touch electrode XE01-09 thereon, to form electrical isolation between the second touch electrodes XE01-09 and the first touch electrodes YE01-06. The mutual-capacitance touch electrode layer 112 shown in FIG. 3A can be implemented by the above structure.

Figure 3B:
Figure 8:
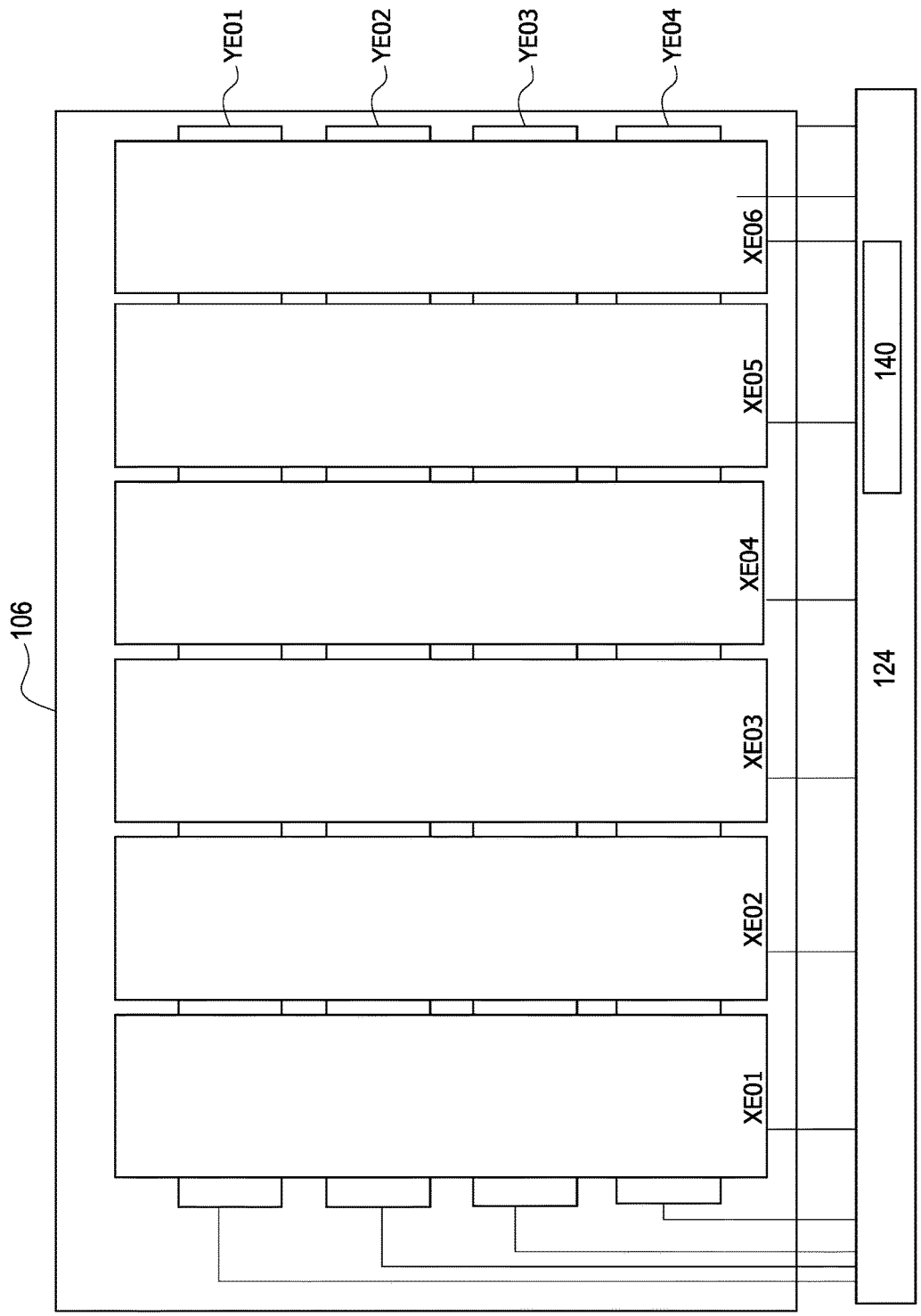
FIG. 8 shows a schematic view of another touch electrode distribution of a mutual-capacitance organic light emitting touch display apparatus with high measuring sensitivity of the present invention.

FIG. 3B shows a stack diagram of the touch display apparatus 10 according to another embodiment of the present invention. The touch electrode layer 112 includes, from top to bottom, a second touch electrode layer 113, an insulation layer 115 and a first touch electrode layer 111. Refer to FIG. 8, FIG. 8 shows an implementation of the touch electrode layer 112 corresponding to the embodiment shown in FIG. 3B. The second touch electrode layer 113 includes a plurality of second touch electrodes XE01-XE06 (arranged along the second direction), while the first touch electrode layer 111 includes a plurality of first touch electrodes YE01-04 (arranged along the first direction), wherein the first direction is not parallel to the second direction and may be substantially perpendicular to the second direction. Moreover, the insulation layer 115 is formed between the first touch electrodes YE01-04 and the second touch electrodes XE01-06 to form electrical isolation therebetween. The mutual-capacitance touch electrode layer 112 shown in FIG. 3B can be implemented by the above structure.

Figure 9:
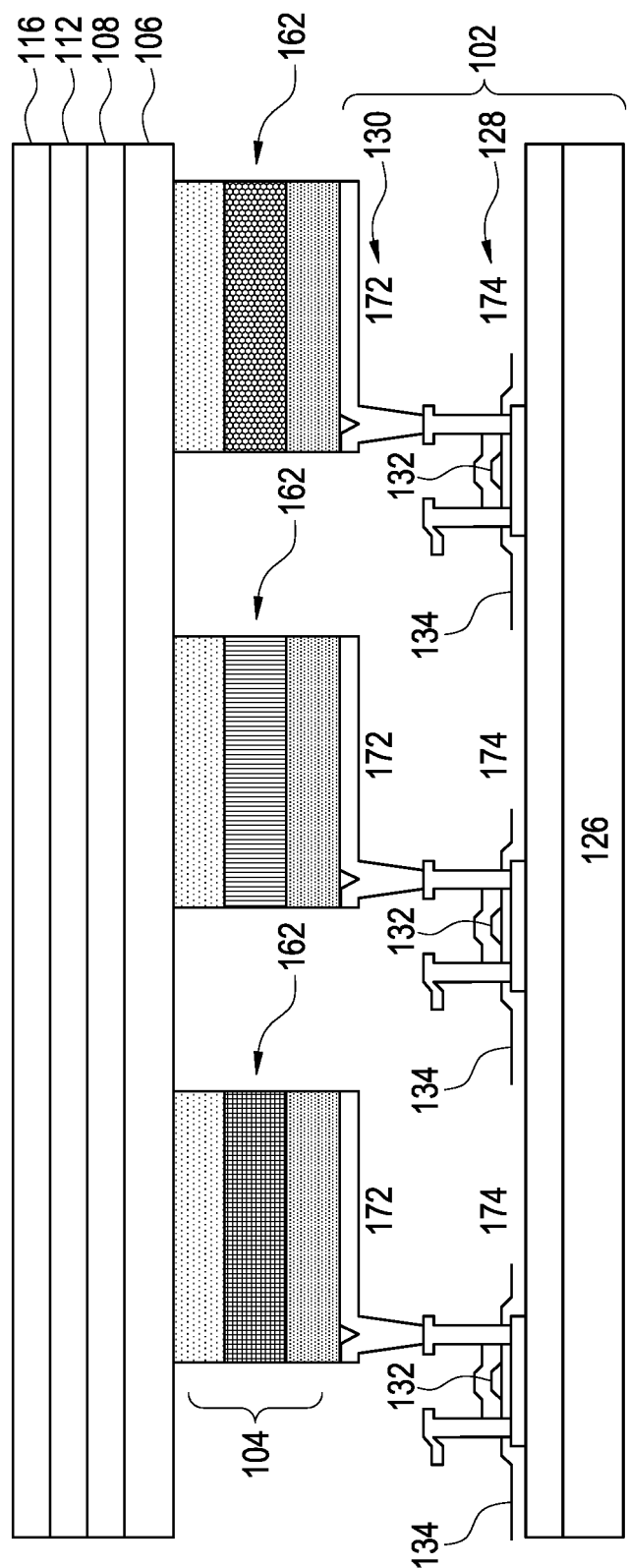
FIGS. 9-15 show detailed structural diagrams of mutual-capacitance organic light emitting touch display apparatuses according to different embodiments of the present invention.

Refer to FIG. 9, FIG. 9 shows a detailed structural diagram corresponding to the embodiments shown in FIG. 3A and FIG. 7. As shown in FIG. 9, the pixel electrode layer 130 includes a plurality of pixel electrodes 172; the thin film transistor layer 128 includes a plurality of thin film transistors 174. The pixel electrodes 172 are arranged to correspond to the thin film transistors 174, the polarity of the pixel electrodes 172 is reverse to that of the common electrode layer 106 (that is, if the pixel electrodes 172 are anode, the common electrode layer 106 is cathode; if the pixel electrodes 172 are cathode, the common electrode layer 106 is anode). The thin film transistors 174 are arranged on the transistor substrate 126. The thin film transistor substrate 102 further includes a plurality of gate lines 132 and a plurality of data lines 134, where the gate lines 132 are electrically connected to the thin film transistors 174, the data lines 134 are electrically connected to the thin film transistors 174. Besides, the organic light emitting material layer 104 includes a plurality of organic light emitting materials 162. As shown in FIG. 9, the colors of the organic light emitting materials 162 are different from each other in the organic light emitting material layer 104, for example, the organic light emitting materials 162 are materials respectively emitting red light, green light, and blue light.

Figure 10:
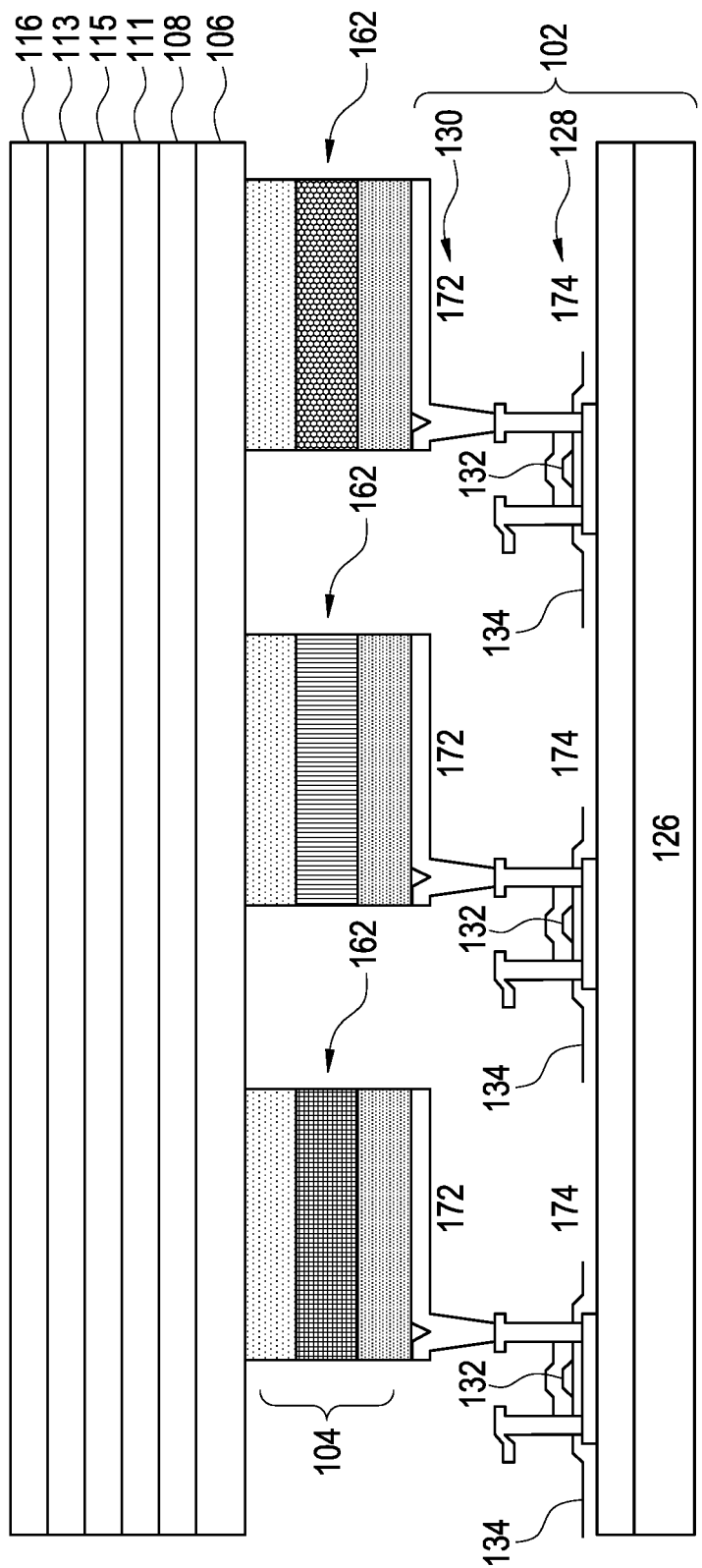

Refer to FIG. 10, FIG. 10 shows a detailed structural diagram corresponding to the embodiments shown in FIG. 3B and FIG. 8. The structure shown in FIG. 10 is similar to that shown in FIG. 9, but the touch electrode layer 112 includes, from top to bottom, a second touch electrode layer 113, an insulation layer 115 and a first touch electrode layer 111.

Figure 6A:
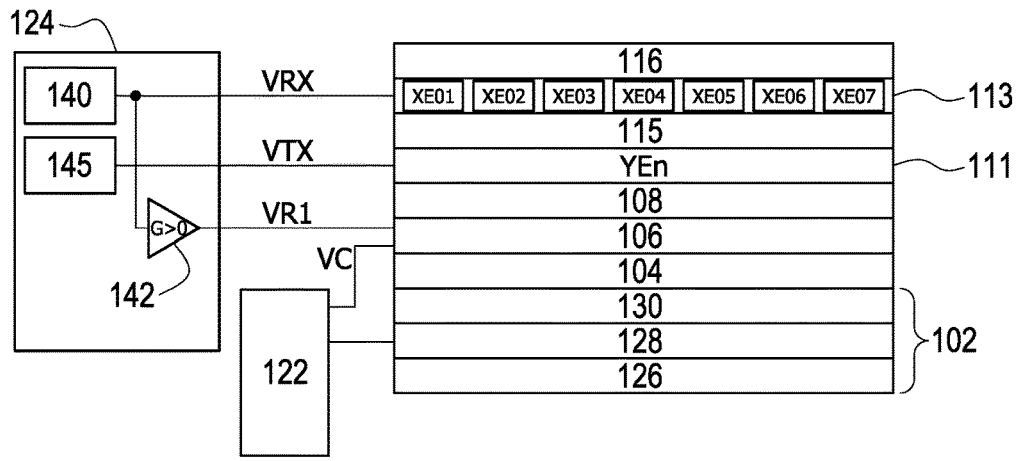
FIGS. 6A-6C are diagrams showing operation of self-capacitance organic light emitting touch display apparatuses according to different embodiments of the present invention.

Refer to FIG. 6A, FIG. 6A is a diagram showing operation of the touch display apparatus 10 according to the present invention. The touch display apparatus 10 can be, for example, referred to embodiments shown in FIG. 3B, FIG. 8 and FIG. 10. Namely, the touch electrode layer 112 includes, from top to bottom, a second touch electrode layer 113, an insulation layer 115 and a first touch electrode layer 111. Besides, the second touch electrode layer 113 includes a plurality of second touch electrodes (such as the shown XE01-XE07), while the first touch electrode layer 111 includes a plurality of first touch electrodes YEn (the distribution thereof can be referred to FIG. 8). During touch sensing operation, a touch driving signal generator 145 of the touch controller 124 sequentially or randomly applies a touch driving signal VTX to the selected first touch electrode YEn, and senses a touch sensing signal VRX at a selected second touch electrode XEm. Besides, the touch controller 124 uses an amplifier 142 with a gain larger than zero to process the touch sensing signal VRX to be a reference signal VR1, then outputs the reference signal VR1 to an adjacent conductor close to the selected second touch electrode, such as the common electrode layer 106 (or a reference point or a connection point of the display controller 122), for facilitating the touch receiver 140 to perform touch sensing. Besides, during touch sensing operation, the display controller 122 may sequentially output a scan signal to the gate line 132 as shown in FIG. 9, the display controller 122 outputs the data signal to each of the data lines 134 as shown in FIG. 9, and the display controller 122 outputs a signal VC of predetermined voltage level (such as a zero voltage signal, negative voltage signal, or positive voltage signal) to the common electrode layer 106 for displaying.

Refer to FIGS. 2A-2F together, in the embodiment shown in FIG. 6A, a reference signal VR1 is applied to an adjacent conductor (such as the common electrode 106) close to the selected second touch electrode XEm, the reference signal VR1 is obtained by processing the touch sensing signal VRX by the amplifier 142 with a gain larger than zero, thus background stray capacitance between the selected second touch electrode XEm and the adjacent conductor can be eliminated equivalently, to improve accuracy of touch sensing. Moreover, because the touch display apparatus 10 may have different structures, the adjacent conductor close to the selected second touch electrode may also be a casing of the touch display apparatus, a shielding electrode or non-selected first (second) touch electrode of the touch display apparatus.

Figure 6B:
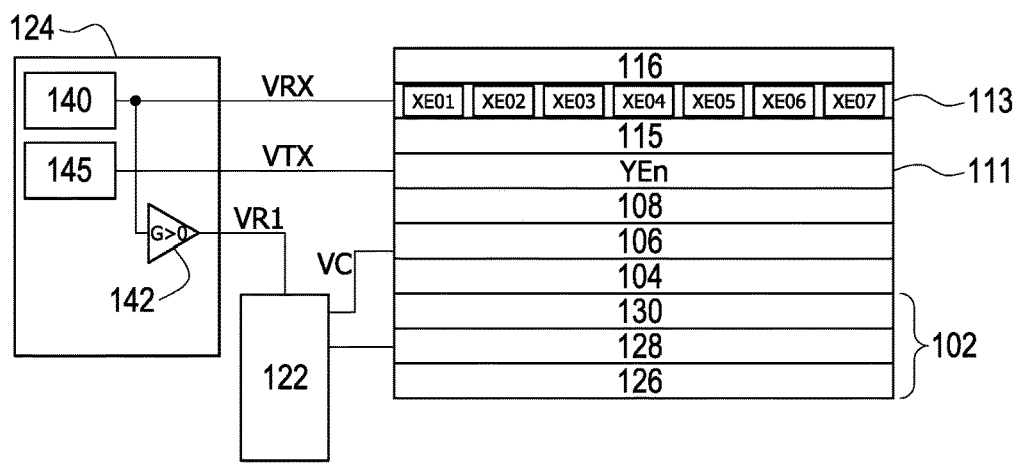

Refer to FIG. 6B, FIG. 6B is a diagram showing operation of the touch display apparatus 10 according to the present invention. The touch display apparatus 10, for example, can also be referred to the embodiments in FIG. 3B, FIG. 8 and FIG. 10. The operation shown in FIG. 6B is similar to that shown in FIG. 6A, but the reference signal VR1 is first applied to a reference point of the display controller 122 (such as a power output point, a grounded point, a node of a DC loop thereof, or an output point of a display signal drive stage in the display controller 122), then the reference signal VR1 is indirectly transmitted to the adjacent conductor (such as the common electrode 106) close to the selected second touch electrode XEm by the display controller 122. Similarly, a reference signal VR1 is applied to the adjacent conductor (such as the common electrode 106) close to the selected second touch electrode XEm, the reference signal VR1 is a signal obtained by processing the touch sensing signal VRX by the amplifier 142 with a gain larger than zero, thus background stray capacitance between the selected second touch electrode XEm and the common electrode 106 can be eliminated equivalently, to improve accuracy of touch sensing.

Figure 6C:
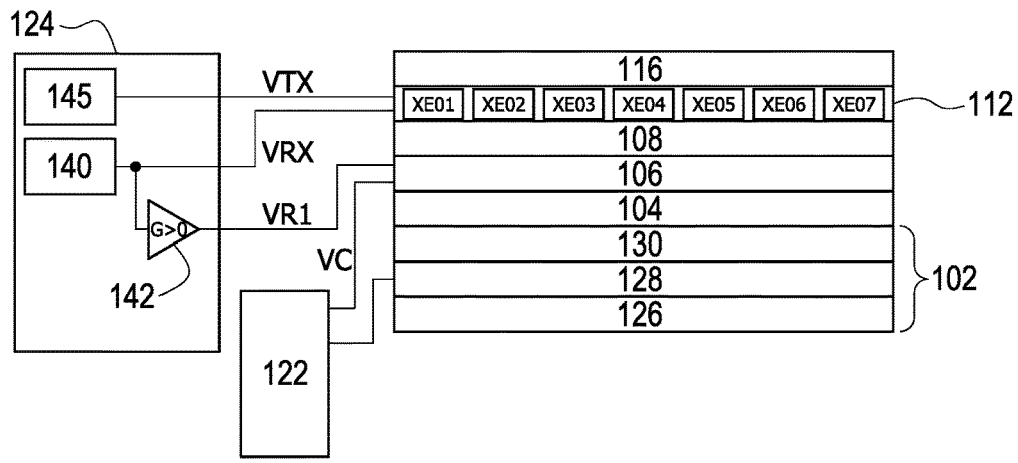

Refer to FIG. 6C, FIG. 6C is a diagram showing operation of the touch display apparatus 10 according to the present invention. The touch display apparatus 10, for example, can also be referred to the embodiments in FIG. 3A, FIG. 7 and FIG. 9. During touch sensing operation, a touch driving signal generator 145 of the touch controller 124 sequentially or randomly applies a touch driving signal VTX to the selected first touch electrode YEn (with reference to FIG. 7), and senses a touch sensing signal VRX at a selected second touch electrode XEm. Besides, the touch controller 124 uses an amplifier 142 with a gain larger than zero to process the touch sensing signal VRX to be a reference signal VR1, then outputs the reference signal VR1 to an adjacent conductor close to the second touch electrode. The adjacent conductor is for example, the common electrode layer 106 (or a reference point or a connection point of the display controller 122), for facilitating the touch receiver 140 to perform touch sensing. Besides, during touch sensing operation, the display controller 122 may sequentially output a scan signal to the gate line 132 as shown in FIG. 9, the display controller 122 outputs the data signal to each of the data lines 134 as shown in FIG. 9, and the display controller 122 outputs a predetermined voltage signal VC with predetermined voltage level (such as a zero voltage signal, negative voltage signal, or positive voltage signal) to the common electrode layer 106 for displaying. Similarly, a reference signal VR1 is applied to the adjacent conductor (such as the common electrode 106) close to the selected second touch electrode XEm, the reference signal VR1 is a signal obtained by processing the touch sensing signal VRX by the amplifier 142 with a gain larger than zero, thus background stray capacitance between the selected second touch electrode XEm and the adjacent conductor can be eliminated equivalently, to improve accuracy of touch sensing.

Figure 4A:
FIGS. 4A-4C show stack diagrams of mutual-capacitance organic light emitting touch display apparatuses according to other different embodiments of the present invention.
Figure 4B:
Figure 4C:

Refer to FIG. 4A, FIG. 4A shows a stack diagram of the touch display apparatus 10 according to an embodiment of the present invention. The embodiment shown in FIG. 4A is similar to that shown in FIG. 3A, and distribution of the first touch electrode YEn and second touch electrode XEm thereof can be referred to the embodiment shown in FIG. 7. However, the organic light emitting material layer 104 of the embodiment only emits white light, thus additional black matrix layer 158 and color filtering layer 160 are needed. The embodiments shown in FIGS. 4B and 4C are similar to that shown in FIG. 4A, and distribution of the first touch electrode YEn and second touch electrode XEm thereof can be referred to that shown in FIG. 7, but positions of the touch electrode layer 112, black matrix layer 158 and color filtering layer 160 are different. The embodiments shown in FIGS. 4A-4C may also be implemented with the architecture shown in FIG. 6C, and background stray capacitance between the second touch electrode XEm and the adjacent conductor close to the second touch electrode XEm can be eliminated equivalently, to improve accuracy of touch sensing.

Figure 5A:
FIGS. 5A-5B show stack diagrams of mutual-capacitance organic light emitting touch display apparatuses according to other different embodiments of the present invention.
Figure 18:
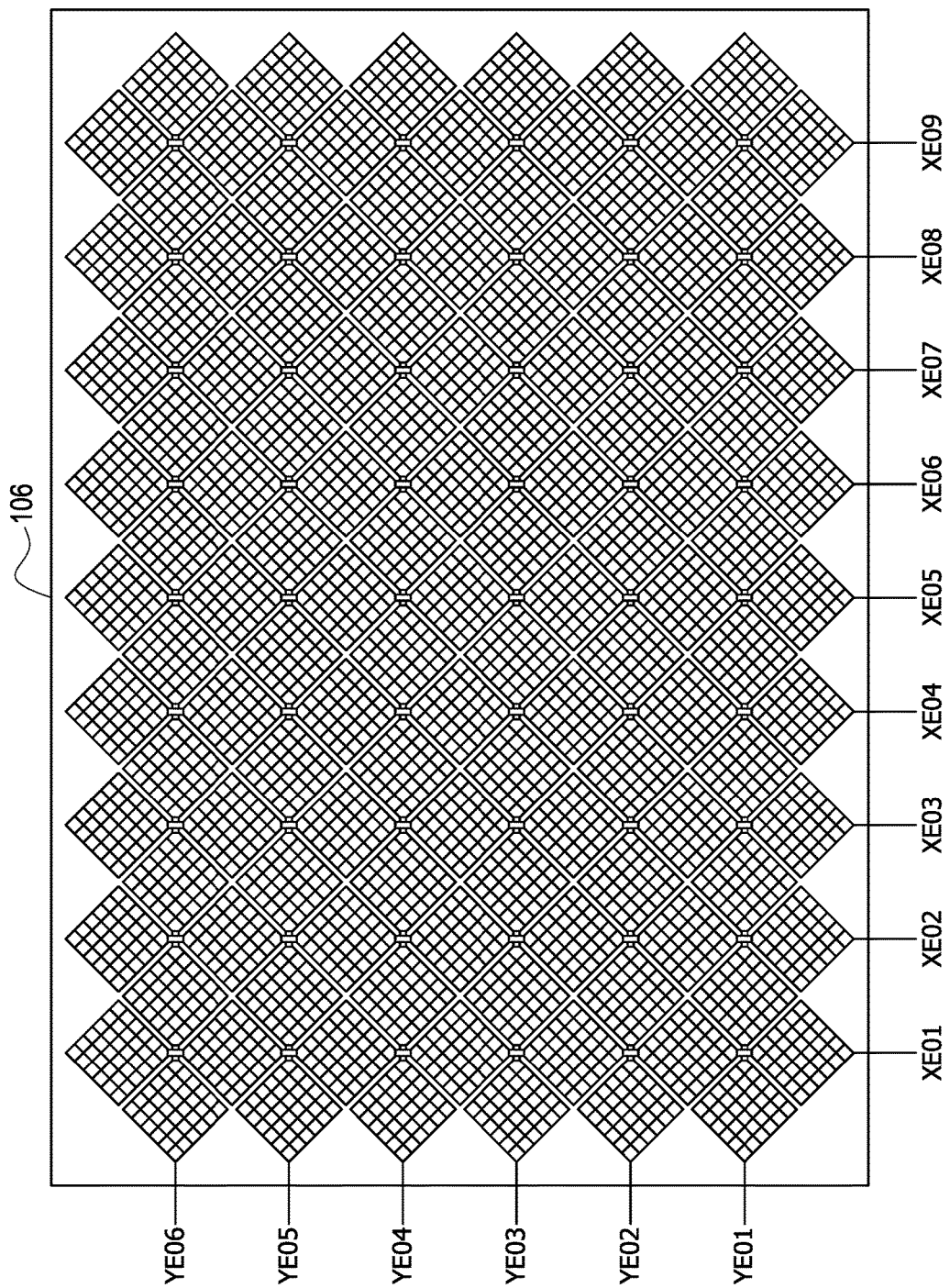
FIG. 18 shows a schematic view of metal grid electrode.

Refer to FIG. 5A, FIG. 5A shows a stack diagram of the touch display apparatus 10 according to an embodiment of the present invention. The embodiment shown in FIG. 5A is similar to that shown in FIGS. 4B and 4C, and distribution of the first touch electrode YEn and second touch electrode XEm thereof can be referred to the embodiment shown in FIG. 7. However, in the embodiment shown in FIG. 5A, a black metal grid touch electrode layer 112a (refer to FIG. 18, the black metal grid touch electrode layer has a plurality of black metal grid touch electrodes XEn, YEn) replaces the black matrix layer 158 and touch electrode layer 112. Because the touch electrode layer is formed by black metal grid, line segments of metal grid may provide light shielding and be used as touch electrode. The embodiments shown in FIG. 5A may also be implemented with the architecture shown in FIG. 6C, similarly background stray capacitance between the second touch electrode XEm and the adjacent conductor close to the second touch electrode XEm can be eliminated equivalently, to improve accuracy of touch sensing.

Figure 5B:

Refer to FIG. 5B, FIG. 5B shows a stack diagram of the touch display apparatus 10 according to an embodiment of the present invention. The embodiment is similar to the touch display apparatus 10 shown in FIG. 3B, and distribution of the first touch electrodes YEn and the second touch electrodes XEm thereof can be referred to the embodiment shown in FIG. 8. However, the organic light emitting material layer 104 of the embodiment only emits white light, thus additional black matrix layer 158 and color filtering layer 160 are needed. Moreover, in the embodiment shown in FIG. 5B, a black metal grid touch electrode layer 113a (with reference to FIG. 18) replaces the black matrix layer 158 and the second touch electrode layer 113 in FIG. 3B. Because the black metal grid touch electrode layer 113a is formed by metal grids, line segments of metal grids may provide light shielding and be used as an upper second touch electrodes, and thus providing mutual-capacitance sensing with the lower first touch electrodes 111. The embodiment shown in FIG. 5B may also be implemented with the architectures shown in FIGS. 6A-6B, similarly background stray capacitance between the touch electrodes of the black metal grid touch electrode layer 113a and the adjacent conductor close to the black metal grid touch electrode layer 113a can be eliminated equivalently, to improve accuracy of touch sensing.

Figure 11:
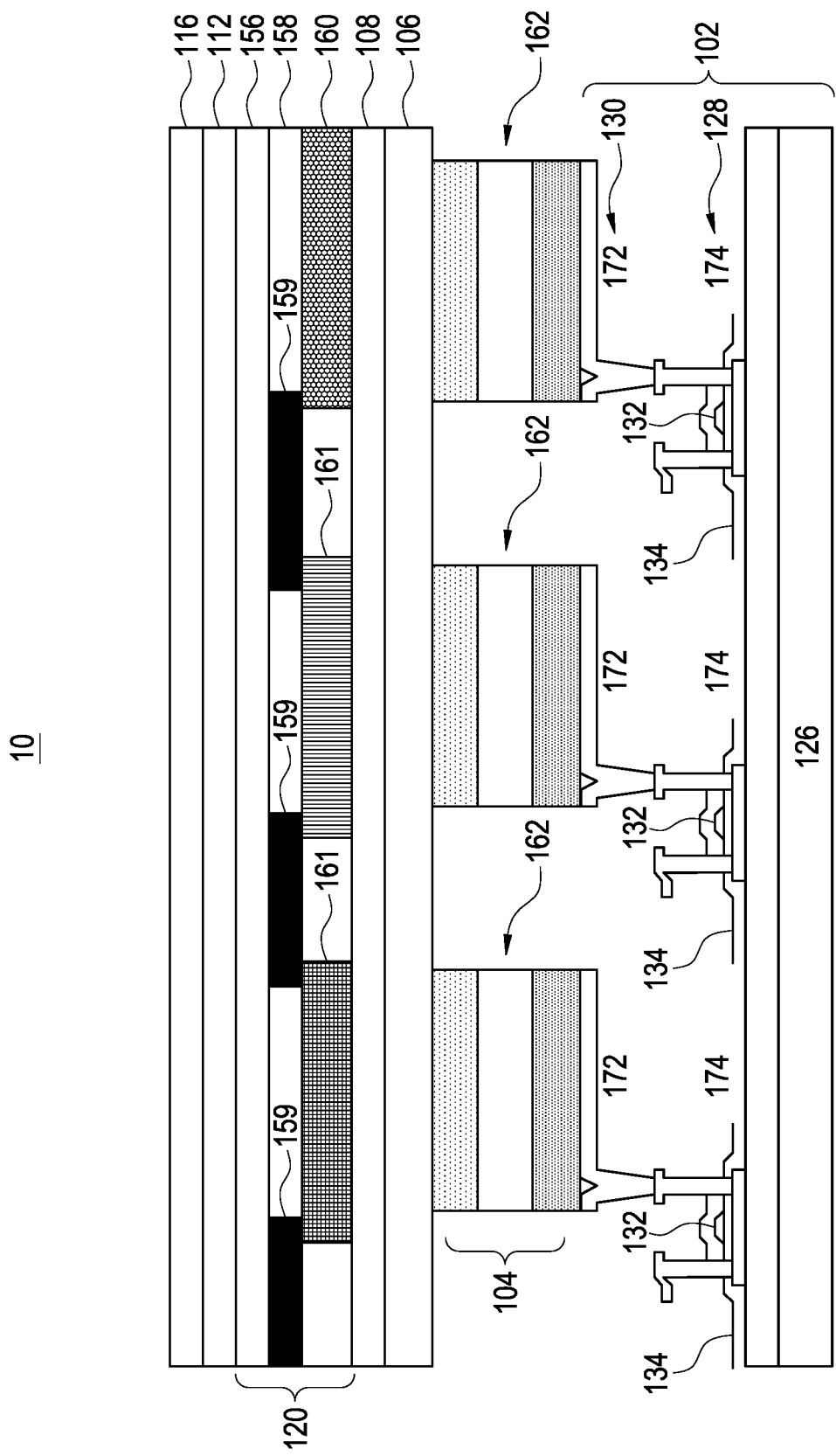

Refer to FIG. 11, FIG. 11 shows detailed structure corresponding to the embodiments shown in FIG. 4B and FIG. 7. All of the organic light emitting materials 162 in the organic light emitting material layer 104 shown in FIG. 11 emit white light, thus additional color filtering structure 120 is needed. The color filtering structure 120 includes a color filtering substrate 156, a black matrix layer 158 and a color filtering material layer 160. The black matrix layer 158 and the color filtering material layer 160 are arranged on the color filtering substrate 156. The black matrix layer 158 blocks skewed light and includes a plurality of black matrix materials 159. The color filtering material layer 160 includes a plurality of color filtering materials 161. As the shown in FIG. 11, all of the organic light emitting materials 162 in the organic light emitting material layer 104 can be the same material for emitting white light, while the color filtering materials 161 are different from each other, the colors of the color filtering materials 161 respectively are red, green and blue.

Figure 12:
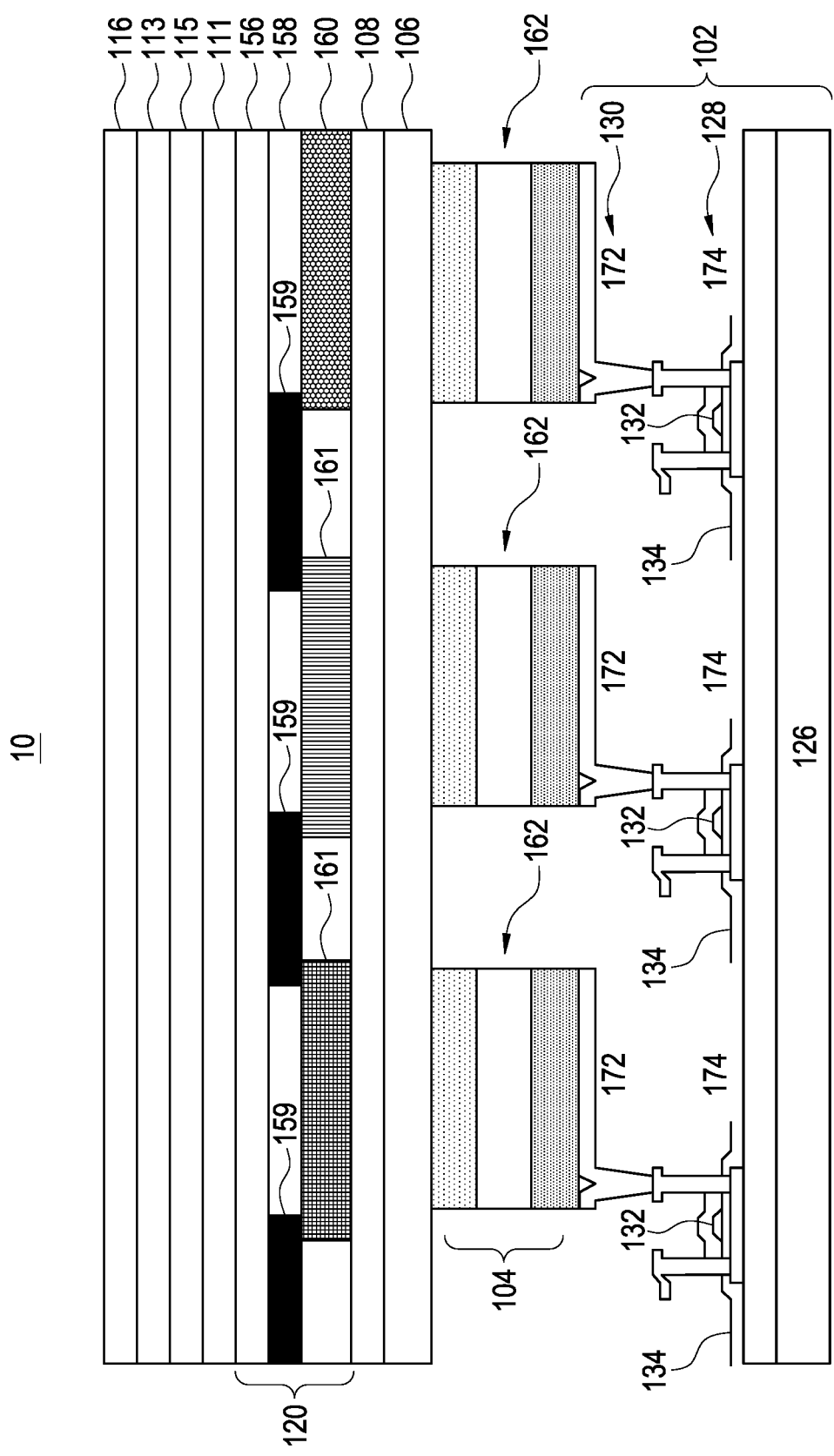

Refer to FIG. 12, FIG. 12 shows detailed structure of the touch display apparatus 10 according to an embodiment of the present invention. The embodiment shown in FIG. 12 is similar to the touch display apparatus 10 shown in FIG. 10. However, all of the organic light emitting materials 162 in the organic light emitting material layer 104 shown in FIG. 12 emit white light, thus additional color filtering structure 120 is needed. The color filtering structure 120 includes a color filtering substrate 156, a black matrix layer 158 and a color filtering material layer 160. The black matrix layer 158 and the color filtering material layer 160 are arranged on the color filtering substrate 156. The black matrix layer 158 blocks skewed light and includes a plurality of black matrix material 159. The color filtering material layer 160 includes a plurality of color filtering materials 161. As the shown in FIG. 11, all of the organic light emitting materials 162 in the organic light emitting material layer 104 can be the same material for emitting white light, while the color filtering materials 161 are different from each other, the colors of the color filtering materials 161 respectively are red, green and blue.

Figure 13:
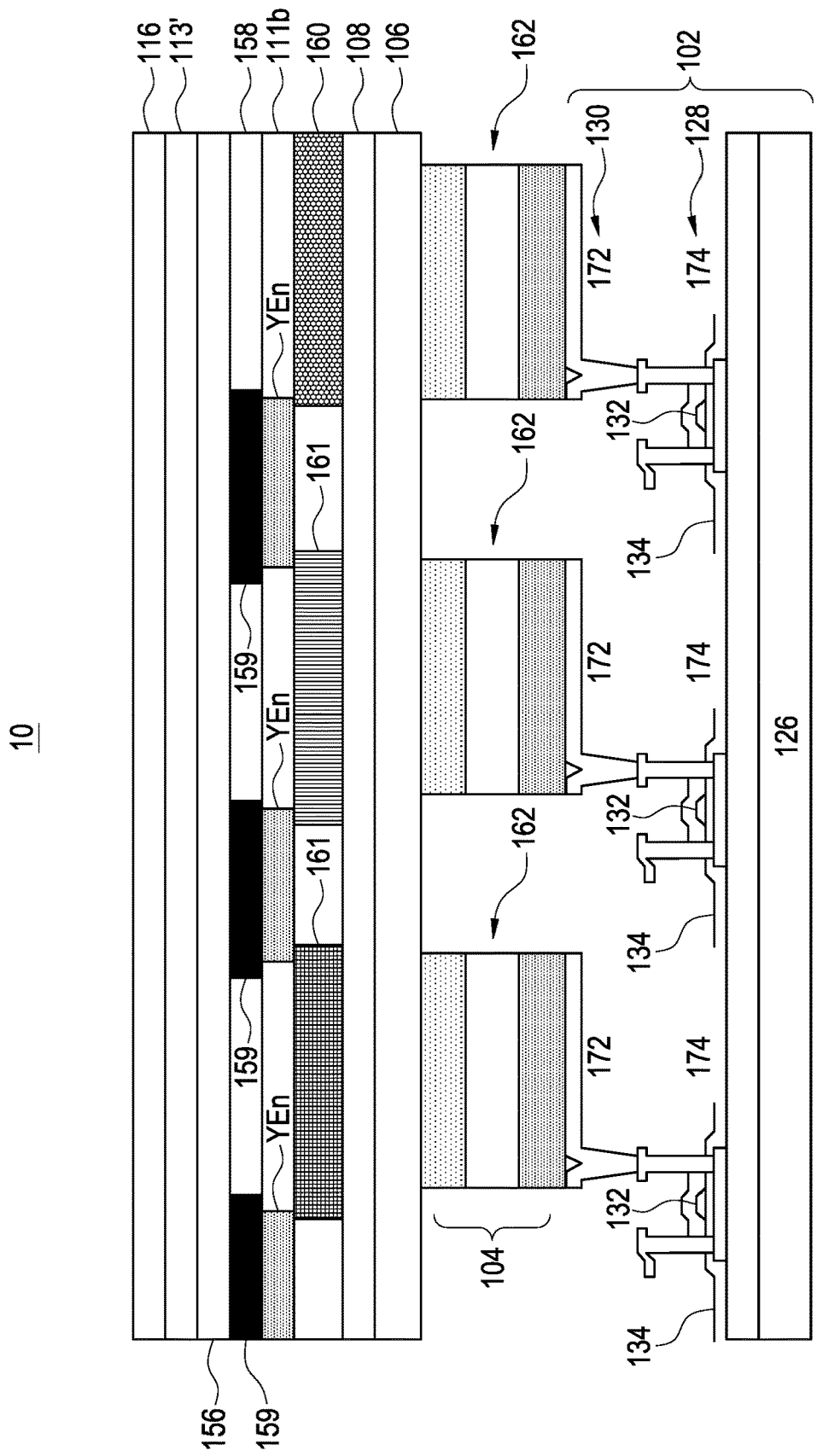

Refer to FIG. 13, FIG. 13 shows detailed structure of the touch display apparatus 10 according to an embodiment of the present invention. The embodiment shown in FIG. 13 is similar to that shown in FIG. 12. However, the first touch electrode layer is implemented with metal grid to be the metal grid touch electrode layer 111*b*, and arranged below the black matrix layer 158 (with reference to FIG. 18, the metal grid touch electrode layer has a plurality of metal grid touch electrodes XEn, YEn). The color filtering substrate 156 provides isolation, thus the insulation layer 115 in FIG. 12 can be omitted. Similarly, the upper touch electrode layer 113' and metal grid touch electrode layer 111*b* can be used as upper and lower touch electrode layers for sensing mutual-capacitance, the touch display apparatus 10 in FIG. 13 can be operated by using the architectures shown in FIG. 6A or FIG. 6B. Similarly, background stray capacitance between the electrodes of the upper touch electrode layer 113' and the adjacent conductor close to the electrode can be eliminated, to improve accuracy of touch sensing.

Figure 14:
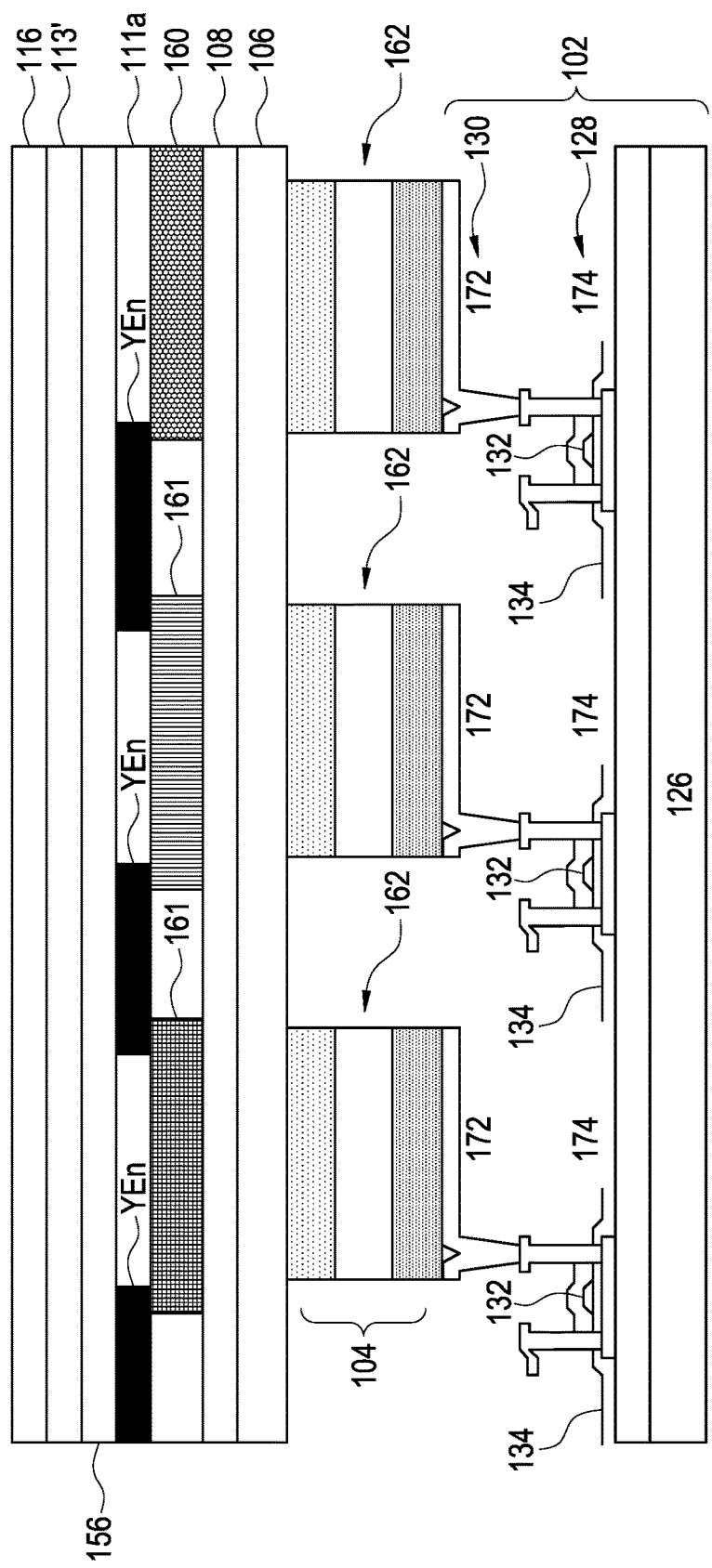

Refer to FIG. 14, FIG. 14 shows detailed structure of the touch display apparatus 10 according to an embodiment of the present invention. The embodiment shown in FIG. 14 is similar to that shown in FIG. 12. However, the first touch electrode layer 111 is implemented with black metal grid to be the black metal grid touch electrode layer 111*a*. Because the black metal grid touch electrode layer 111*a* is formed by metal grids, line segments of metal grids may provide light shielding to replace black matrix layer, and be used as lower first touch electrode. Moreover, the color filtering substrate 156 provides isolation, thus the insulation layer 115 in FIG. 12 can be omitted. The touch display apparatus 10 in FIG. 14 can be operated by using the architectures shown in FIG. 6A or FIG. 6B. Similarly, background stray capacitance between the electrode of the upper touch electrode layer 113' and the adjacent conductor close to the electrode can be eliminated, to improve accuracy of touch sensing.

Figure 15:
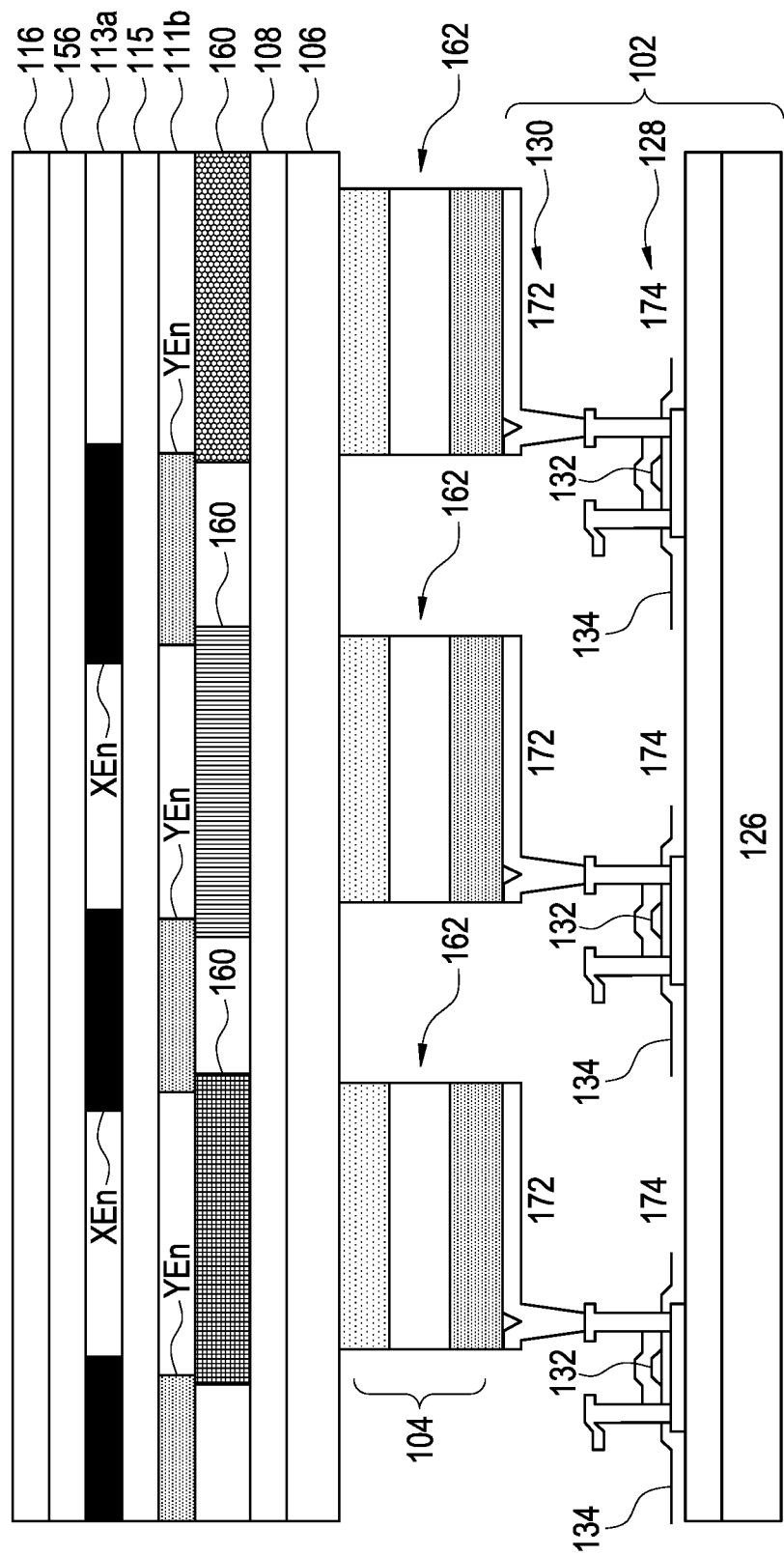
Figure 19:
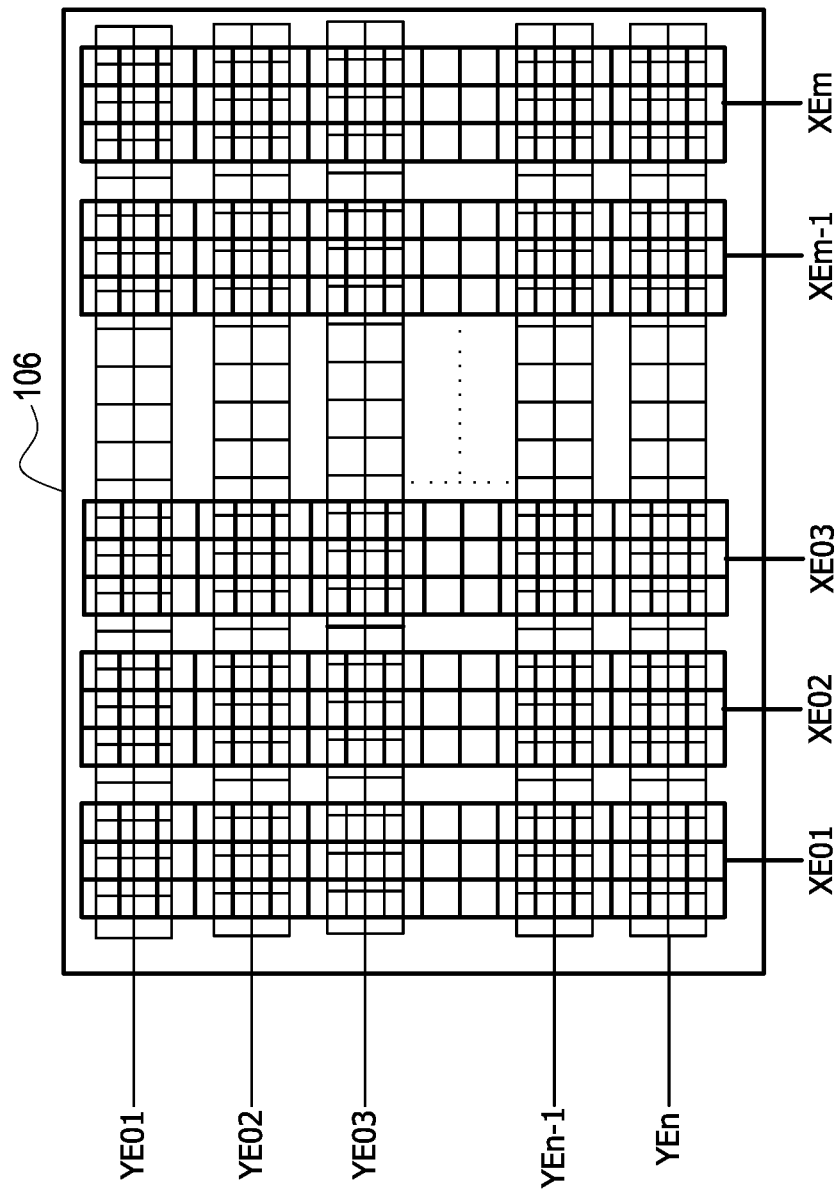
FIG. 19 shows another schematic view of metal grid electrode.

Refer to FIG. 15, FIG. 15 shows detailed structure of the touch display apparatus 10 according to an embodiment of the present invention. The embodiment shown in FIG. 15 is similar to that shown in FIG. 12. However, the first touch electrode layer 111 is implemented with metal grid to be the metal grid touch electrode layer 111*b* in FIG. 15, the second touch metal layer 113 in FIG. 12 is implemented with black metal grid to be the black metal grid touch electrode layer 113*a* in FIG. 15. Because the black metal grid may provide light shielding, thus the black matrix layer can be omitted (with reference to FIG. 19, dual metal grid touch electrode layer has a plurality of metal grid touch electrodes XEm, YEn). The touch display apparatus 10 in FIG. 15 can be operated by using the architectures shown in FIG. 6A or FIG. 6B. Similarly, background stray capacitance between the electrode of the upper black metal grid touch electrode layer 113*a* and the adjacent conductor close to the electrode can be eliminated, to improve accuracy of touch sensing.

Figure 16:
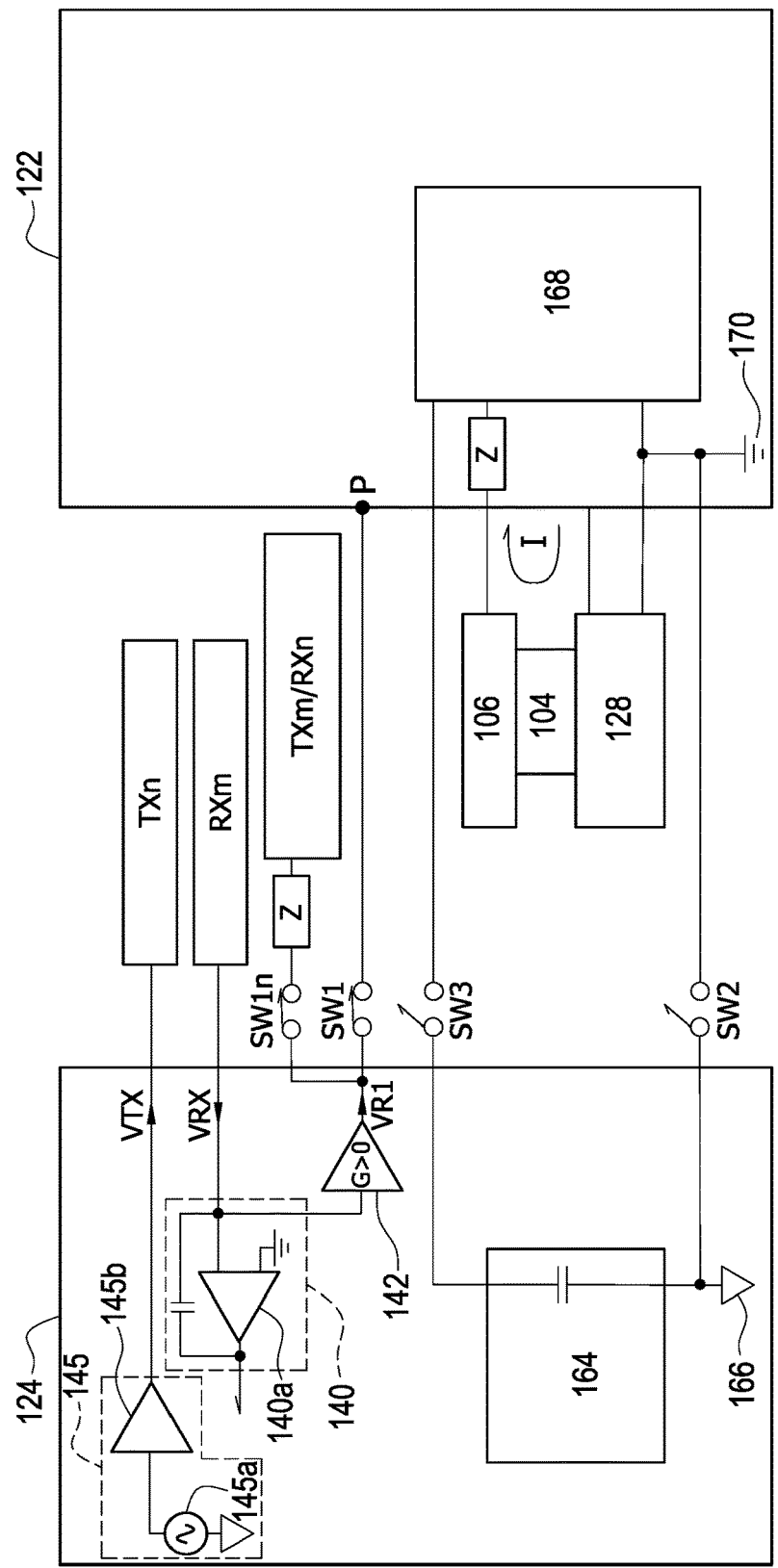
FIG. 16 is a schematic view showing operation of mutual-capacitance organic light emitting touch display apparatus of the present invention.

Refer to FIG. 16, FIG. 16 is a schematic view showing operation of the touch display apparatus 10 according to an embodiment of the present invention. The touch display apparatus 10 can be implemented with embodiments shown in FIGS. 3A-3B, FIGS. 4A-4C, FIGS. 5A-5B, FIGS. 7-15. However, it can be known by skilled person in the field that, the touch display apparatus 10 can be implemented with other schemes within scope of the present invention. The touch display apparatus 10 according to the present invention at least includes a plurality of first touch electrodes TX (such as the touch electrodes YE01-YE04 shown in FIG. 8) arranged along the first direction, a plurality of second touch electrodes RX (such as the touch electrodes XE01-XE06 shown in FIG. 8) arranged along the second direction, and a touch controller 124. The touch controller 124 includes a touch driving signal generator 145 (including a touch driving signal source 145*a* and a driver circuit 145*b*), a touch receiver 140 (including an amplifier 140*a* and a capacitance 140*b*), an amplifier (non-inverting amplifier) 142 with a gain larger than zero. The touch controller 124 further includes a touch power source 164 and a touch grounded end 166. The touch display apparatus 10 further includes a display power source 168, a display grounded end 170 and a plurality of impedances Z. The touch display apparatus 10 further includes a first switch set (including first switches SW1, SW1*n*) connected between the amplifier 142 and the display controller 122, and connected between the amplifier 142 and non-selected first (second) touch electrode, a second switch SW2 connected between the touch grounded end 166 and the display grounded end 170, and a third switch SW3 connected between the touch power source 164 and the display power source 168.

During touch sensing operation, the emitting driver 145*b* sequentially or randomly applies a touch driving signal to a selected first touch electrode TXn, and senses a touch sensing signal VRX at a corresponding second touch electrode RXm by the touch receiver 140. The touch controller 124 processes the touch sensing signal VRX by the amplifier 142 with a gain larger than zero to generate a reference signal VR1, and transmits the reference signal VR1 through the first switch SW1 (turned on) to a reference point of the display controller 122, the reference point can be a power source output point of the display controller 122, a grounded point of the display controller 122 or a driving stage of the display controller 122. Moreover, touch controller 124 may also transmit the reference signal VR1 through the first switch SW1*n* (turned on) to non-selected first (second) touch electrode TXm/RXn. Besides, during touch sensing operation, the second switch SW2 and the third switch SW3 are turned off. Because there is only a single physical connection point (connected by the first switch SW1) between the display controller 122 and the touch controller 124, and the touch grounded end 166 and the display grounded end 170 are different grounded ends, thus there is no common current loop between the display controller 122 and the touch controller 124, and the noise of the display controller 122 is prevented from influencing measuring of the touch controller 124. If not during the touch sensing operation, the first switch SW1 may also be turned off, and the second switch SW2 and third switch SW3 may be turned on, to charge the touch power source 164 with the display power source 168. Moreover, similar to aforementioned effect, processing the touch sensing signal VRX by the amplifier 142 with a gain larger than zero, and then transmitting the touch sensing signal VRX through first switch SW1 to a reference point of the display controller 122 (or transmitting the reference signal to the common electrode 106 through the display power source 168 and an impedance Z), this can reduce background stray capacitance between the selected second touch electrode RXm and an adjacent conductor nearby, thus improving accuracy of touch sensing. Besides, with reference to FIG. 8 together, the reference signal VR1 is also transmitted through the first switch SW1*n* (turned on) to non-selected first (second) touch electrode TXm/RXn, to further eliminate background stray capacitance between the selected second touch electrode TXn/RXm and non-selected first (second) touch electrode TXm/RXn. If not during the touch sensing operation, the first switches SW1, SW1n may also be turned off, and the second switch SW2 and third switch SW3 may be turned on, to charge the touch power source 164 with the display power source 168.

Figure 17:
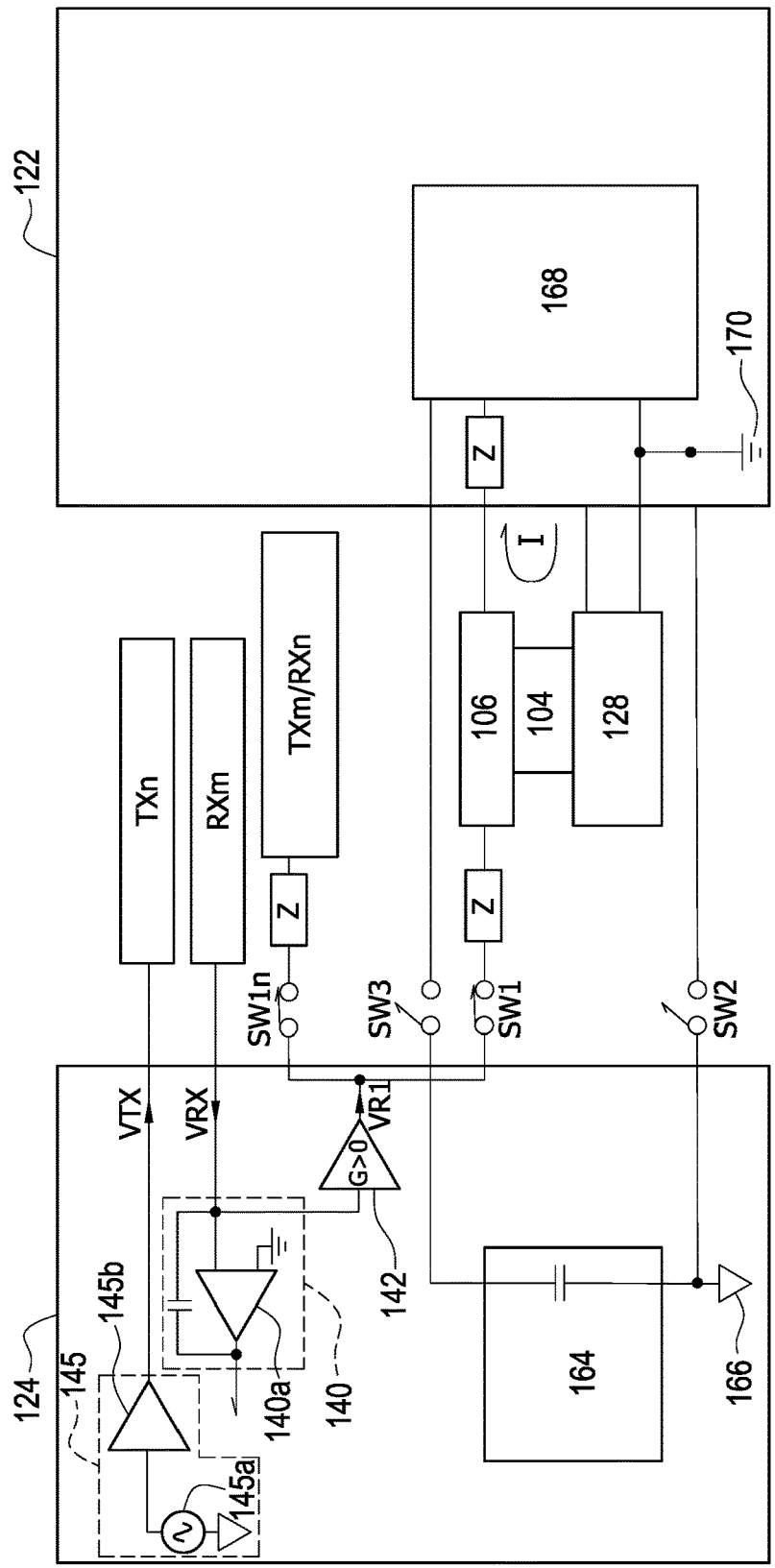
FIG. 17 is another schematic view showing operation of mutual-capacitance organic light emitting touch display apparatus of the present invention.

Refer to FIG. 17, FIG. 17 is a schematic view showing operation of the touch display apparatus 10 according to an embodiment of the present invention the present invention an embodiment. Compared with FIG. 16, the amplifier 142 of the touch display apparatus 10 with a gain larger than zero is connected to the common electrode 106 through a first switch SW1. Similarly, the amplifier 142 of the mutual-capacitance touch display apparatus 10 with a gain larger than zero is connected to non-selected first (second) touch electrodes TXm/RXn by another first switch SW1n. The touch grounded end 166 is connected to the display grounded end 170 by a second switch SW2. The touch power source 164 is connected to the display power source 168 by a third switch SW3. Similarly, during touch sensing operation, the emitting driver 145b sequentially or randomly applies a touch driving signal VTX to a selected first touch electrode TXn, and senses a touch sensing signal VRX at a corresponding (selected) second touch electrode RXm by the touch receiver 140. The touch controller 124 further processes the touch sensing signal VRX by the amplifier 142 with a gain larger than zero, and then generates a reference signal VR1, and transmits the reference signal VR1 to the common electrode 106 through the first switch SW1 (turned on). Moreover, touch controller 124 may also transmit the reference signal VR1 through the first switch SW1n (turned on) to non-selected first (second) touch electrodes TXm/RXn. Besides, during touch sensing operation, the second switch SW2 and the third switch SW3 are turned off. Because there is only a single physical connection point (connected by the first switch SW1) between the display controller 122 and the touch controller 124, and the touch grounded end 166 and the display grounded end 170 are different grounded ends, thus there is no common current loop between the display controller 122 and the touch controller 124, and the noise of the display controller 122 is prevented from influencing measuring of the touch controller 124. Moreover, similar to aforementioned effect, processing the touch sensing signal VRX by the amplifier 142 with a gain larger than zero, and then transmitting the touch sensing signal VRX through first switch SW1 to the common electrode 106, this can reduce background stray capacitance between the second touch electrode RXm and an adjacent conductor nearby, thus improving accuracy of touch sensing. If not during the touch sensing operation, the first switch SW1 may also be turned off, and the second switch SW2 and third switch SW3 may be turned on, to charge the touch power source 164 with the display power source 168. Moreover, similar to aforementioned effect, processing the touch sensing signal VRX by the amplifier 142 with a gain larger than zero, and then transmitting the touch sensing signal VRX through the first switch SW1 to a reference point of the display controller 122 (or transmitting the reference signal to the common electrode 106 through the display power source 168 and an impedance Z), this can reduces background stray capacitance between the selected second touch electrode RXm and an adjacent conductor nearby, thus improving accuracy of touch sensing. If not during the touch sensing operation, the first switches SW1, SW1n may also be turned off, and the second switch SW2 and third switch SW3 may be turned on, to charge the touch power source 164 with the display power source 168.

Thus, particular embodiments have been described. Other embodiments are within the scope of the following claims. For example, the actions recited in the claims may be performed in a different order and still achieve desirable results.

What is claimed is:

1. A mutual-capacitance organic light emitting touch display apparatus comprising:
    a thin film transistor substrate having a plurality of thin film transistors, a plurality of pixel electrodes, a plurality of gate lines and a plurality of data lines arranged on a surface of the thin film transistor substrate, wherein the thin film transistors are respectively connected to the pixel electrodes, the gate lines and the data lines corresponding to the thin film transistors;
    a common electrode layer;
    an organic light emitting material layer arranged between the common electrode layer and the thin film transistor substrate;
    at least a touch electrode layer arranged on a side of the common electrode layer, and the side opposite to the organic light emitting material layer, the touch electrode layer comprising a plurality of first touch electrodes arranged along a first direction, and a plurality of second touch electrodes arranged along a second direction, wherein the first direction differs from the second direction;
    a thin film encapsulation layer arranged between the thin film transistor substrate and the touch electrode layer;
    a display controller having a display power source, and electrically connected to the thin film transistors, the pixel electrodes and the common electrode layer;
    a touch controller comprising a touch power source, a touch driving signal generator, a touch receiver, and a non-inverting amplifier, wherein during touch sensing operation, the touch driving signal generator sequentially or randomly applies a touch driving signal to a selected first touch electrode, the touch receiver senses a touch sensing signal at a second touch electrode, and the non-inverting amplifier processes the touch sensing signal and sends processed touch sensing signal to a reference point of the display controller, for the touch controller to perform touch sensing,
    wherein the display controller and the touch controller have no common current loop therebetween during touch sensing;
    wherein the display power source is different from the touch power source;
    wherein during touch sensing operation, there is only one single physical connection point between the display controller and the touch controller; and
    wherein the reference point of the display controller is a power source output point of the display controller, a grounded point of the display controller, or a driving stage of the display controller.

2. The touch display apparatus of claim 1, wherein the display controller sequentially outputs a scan signal to a gate line, outputs data signal to each of the data lines and outputs a zero voltage signal, negative voltage signal, or positive voltage signal to the common electrode layer for displaying.

3. The touch display apparatus of claim 1, wherein the touch controller further applies a signal with same phase as that of the touch sensing signal to non-selected first touch electrodes or non-selected second touch electrodes.

4. The touch display apparatus of claim 1, further comprising at least a switch arranged between the touch controller and the common electrode layer.

5. The touch display apparatus of claim 1, further comprising at least a switch arranged between the touch controller and the display controller.

6. The touch display apparatus of claim 1, further comprising a touch protection layer arranged on a side of the touch electrode layer, and the side opposite to the organic light emitting material layer, the touch protection layer being a substrate or a cured coating layer.

7. The touch display apparatus of claim 1, wherein the first touch electrodes or the second touch electrodes are transparent conductive electrodes.

8. The touch display apparatus of claim 1, wherein the first touch electrodes or the second touch electrodes are black metal grid touch electrodes.

9. The touch display apparatus of claim 6, further comprising a color filtering layer and a black matrix layer, wherein the color filtering layer and the black matrix layer are arranged between the touch protection layer and the common electrode layer.

10. The touch display apparatus of claim 9, wherein the touch electrodes are metal grid touch electrodes and the metal grid touch electrodes are arranged on positions corresponding to the black matrix layer.

11. The touch display apparatus of claim 1, further comprising an insulation layer arranged between the first touch electrodes and the second touch electrodes.

\* \* \* \* \*